P. C. EMSLIE.
ALARM DEVICE FOR CULINARY UTENSILS.
APPLICATION FILED SEPT. 2, 1909.
957,663.
Patented May 10, 1910.
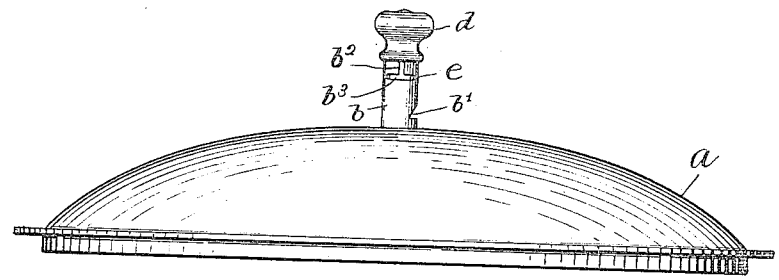
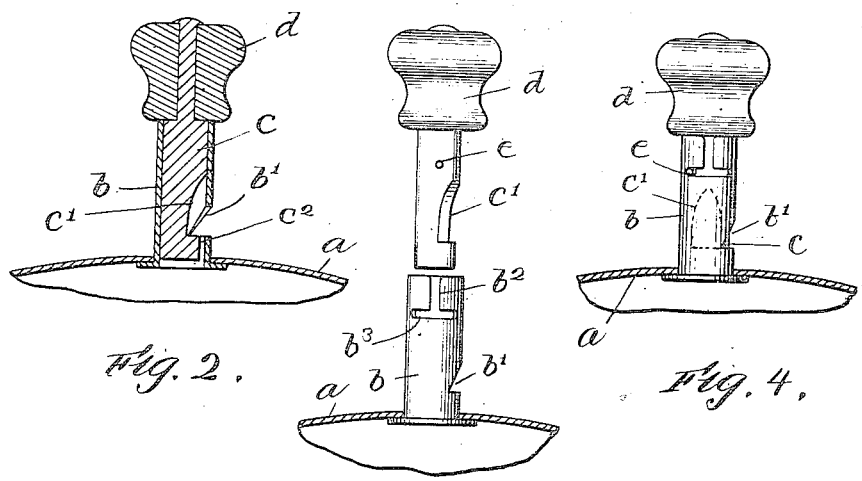
Witnesses:
H. B. Davis
Cynthia Doyle
Inventor:
Paula C. Emslie
by Noyes & Harriman
Atty's

UNITED STATES PATENT OFFICE.

PAULA CÉCILE EMSLIE, OF BOSTON, MASSACHUSETTS.

ALARM DEVICE FOR CULINARY UTENSILS.

957,663.

Specification of Letters Patent. Patented May 10, 1910.

Application filed September 2, 1909. Serial No. 515,918.

*To all whom it may concern:*

Be it known that I, PAULA CÉCILE EMSLIE, of Boston, county of Suffolk, State of Massachusetts, have invented an Improvement in Alarm Devices for Culinary Utensils, of which the following is a specification.

This invention relates to certain improvements in whistle alarms adapted to be applied to the covers of culinary utensils, so that, when the contents thereof boil, the steam which is driven off will sound an alarm.

The object of my invention is to provide a simple device of this character, which is adapted to be adjusted from a position in which the whistle may be sounded to positions in which discharge of steam will be prevented, and the whistle will, therefore, not be sounded, and which is also provided with a removable part which permits the steam to escape without sound being made, the whole device being adapted for use as a handle for the cover.

For an understanding of my invention, reference is made to the accompanying drawing, in which, Figure 1 is a side elevation of a cover provided with my invention. Fig. 2 is an enlarged central sectional view of my device. Fig. 3 is a side elevation thereof showing the parts disconnected. Fig. 4 is a similar view showing the parts adjusted to prevent the sounding of the alarm.

As shown in the drawing, the cover $a$ has a sleeve $b$ rigidly mounted therein, said sleeve having a cylindrical bore extending from end to end thereof, so that it opens at both sides of the cover, and having a whistle opening $b'$ in its side, closely adjacent the upper side of the cover. A cylindrical shaped whistle member $c$ is adapted to be inserted in the bore of the sleeve $b$, at its upper end, and to fit in it with sufficient closeness to close it, and yet permit rotation of the member therein. Said member $c$ is provided with a whistle recess $c'$ in its side, which is adapted to register at its lower portion with the opening $b'$ in the sleeve, when said member is in position of use, the recessed side of said member being provided with a flattened or cut away portion $c^2$, which extends from the recess $c'$ to its lower end, to provide a narrow passage between the member and the sleeve in such a position that the steam forced therethrough will cause an audible sound.

A handle $d$ is connected to the upper end of the member $c$, and a pin $e$ is provided in the side thereof, which is adapted to enter a slot $b^2$ in the sleeve, which leads from the upper end, longitudinally thereof, into the middle of a transverse slot $b^3$, also formed therein, so that a bayonet joint connection is provided between the whistle member and the sleeve. The ends of the slot $b^3$ are so arranged that when the member $c$ is inserted in the sleeve and turned, so that the pin $e$ engages one end of said slot, said member will be held in operative position, as shown in Figs. 1 and 2, permitting the whistle to be sounded, and when turned so that the pin $e$ engages the opposite end of the slot $b^3$ the recess $e'$ will be turned out of register with the passage $b'$, as shown in Fig. 4, so that the escape of steam through the whistle and the sounding of the alarm will be prevented. If it is desired to remove the whistle member, so that the free escape of steam may be permitted through the sleeve, the member is turned so that the pin $e$ is opposite the slot $b^2$, in which position it may be withdrawn, as indicated in Fig. 3.

It will be apparent that when the member $c$ is in position in the sleeve, it will serve the additional function of a handle for the cover.

Having thus described my invention, what I claim as new and desire to secure by Letters Patent is:—

1. An alarm device for kettles and the like, comprising a sleeve adapted to be rigidly secured to the kettle cover in open communication with the inner side thereof, said sleeve having a whistle-opening in its side, and a whistle member rotatably mounted in said sleeve and having a recess adapted, in certain positions thereof, to register with said opening and to provide a whistle passage from beneath the cover to said recess, substantially as described.

2. An alarm device for kettles and the like, comprising a sleeve adapted to be rigidly secured to the kettle cover in open communication with the inner side thereof, said sleeve having a whistle-opening in its side, and a whistle member rotatably mounted in said sleeve and having a recess adapted, in certain positions thereof, to register with said opening and to provide a whistle passage from beneath the cover to said recess, said whistle member having a handle above the upper end of the sleeve for turning said member from an operative to an inoperative position, substantially as described.

3. In combination with a cover for kettles and the like, an alarm device comprising an open ended sleeve, adapted to be mounted in, and opening at both sides of the cover, said sleeve having a whistle opening in its side at the upper side of the cover, and a whistle member adapted to be rotatably fitted in said sleeve and having a whistle recess in the side thereof in open communication with the under side of the cover, said member being rotatable from a position in which said recess is in register with said whistle opening to a position out of register therewith, to close the whistle passage, substantially as described.

4. In combination with a cover for kettles and the like, an alarm device comprising an open ended sleeve, adapted to be mounted in, and opening at both sides of the cover, said sleeve having a whistle opening in its side at the upper side of the cover, and a whistle member adapted to be rotatably fitted in said sleeve and having a whistle recess in the side thereof in open communication with the under side of the cover and adapted, when in position therein, to be held in register with said whistle opening, said member being adapted to be removably inserted in the upper end of said sleeve and having a handle at its upper end, and means for engaging the sleeve to prevent withdrawal therefrom, substantially as described.

5. In combination with a cover, a whistle-member mounted therein and having a passage therethrough leading to the inner side of the cover and a removable whistle-member having a handle at one end and insertible at the other in said passage to connect it to the cover and to coöperate with said cover member to sound an alarm when steam is forced through said passage, substantially as described.

In testimony whereof, I have signed my name to this specification, in the presence of two subscribing witnesses.

PAULA CÉCILE EMSLIE.

Witnesses:
L. H. HARRIMAN,
CYNTHIA DOYLE.